(12) United States Patent
Hegmann et al.

(10) Patent No.: US 6,641,142 B2
(45) Date of Patent: Nov. 4, 2003

(54) CYLINDER HEAD GASKET

(75) Inventors: Oliver Hegmann, Ginsheim (DE); Klaus Böhm, Idstein (DE); Siegbert Path, Limburg (DE)

(73) Assignee: Elringklinger AG, Dettinger (DE)

( * ) Notice: Subject to any disclaimer, the term of this patent is extended or adjusted under 35 U.S.C. 154(b) by 0 days.

(21) Appl. No.: 09/850,215

(22) Filed: May 7, 2001

(65) Prior Publication Data

US 2001/0048200 A1 Dec. 6, 2001

(30) Foreign Application Priority Data

May 23, 2000 (DE) .......................................... 100 25 400
Sep. 20, 2000 (DE) .......................................... 100 46 502

(51) Int. Cl.$^7$ ................................................ F02F 11/00
(52) U.S. Cl. ...................... 277/594; 277/591; 277/595; 277/598
(58) Field of Search ................................. 277/591, 594, 277/595, 598

(56) References Cited

U.S. PATENT DOCUMENTS

| 4,485,138 | A | * | 11/1984 | Yamamoto et al. | ......... 277/592 |
| 5,141,237 | A | * | 8/1992 | Yamada et al. | ............. 277/317 |
| 5,544,901 | A | * | 8/1996 | Kubouchi et al. | .......... 277/591 |
| 5,895,056 | A | * | 4/1999 | Habuta et al. | ............... 277/598 |
| 6,056,296 | A | * | 5/2000 | Ii | ............................... 277/595 |
| 6,349,944 | B1 | * | 2/2002 | Sugiyama et al. | .......... 277/591 |
| 2002/0027327 | A1 | * | 3/2002 | Sugimoto et al. | ........... 277/592 |

FOREIGN PATENT DOCUMENTS

| DE | 43 37 758 C1 | | 1/1995 | |
| DE | 198 09 755 | * | 9/1999 | |
| DE | 19809755 A1 | * | 9/1999 | ............ F02F/11/00 |
| EP | 0 059 777 A1 | | 9/1982 | |
| EP | 0 701 051 B1 | | 3/1996 | |
| JP | 09177605 A | * | 7/1997 | ............ F02F/11/00 |
| JP | 9-177605 A1 | * | 9/1997 | ............ F02F/11/00 |
| JP | 9-177605 | * | 9/1997 | |
| JP | 9-280110 A1 | * | 9/1997 | ............ F02F/11/00 |
| JP | 9-280110 | * | 9/1997 | |
| JP | 09280110 A | * | 10/1997 | ............ F02F/11/00 |

* cited by examiner

*Primary Examiner*—Anthony Knight
*Assistant Examiner*—Christopher Boswell

(57) ABSTRACT

Elongate cylinder head gasket for a multicylinder engine comprising a chain case, with a chain case part which is to be mounted following clamping of the gasket and is guided for displacement parallel to the plane of the gasket; in order that the cylinder head gasket will not be damaged at its one narrow side when inserting this chain case part, the outer edge area of a center narrow side portion on this narrow side is bent out of the plane of the gasket, more particularly, in a direction which points away from the chain case part which is to be inserted.

4 Claims, 3 Drawing Sheets

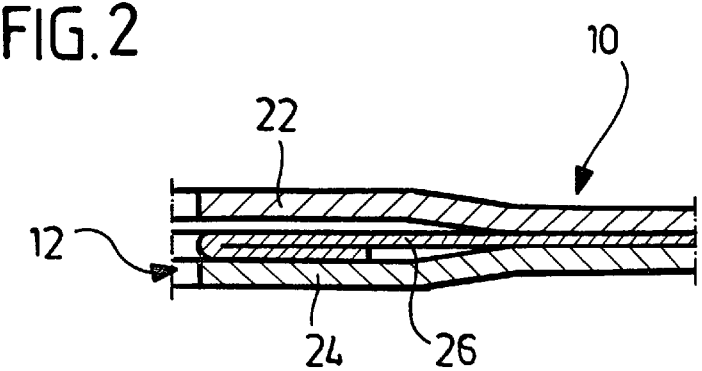
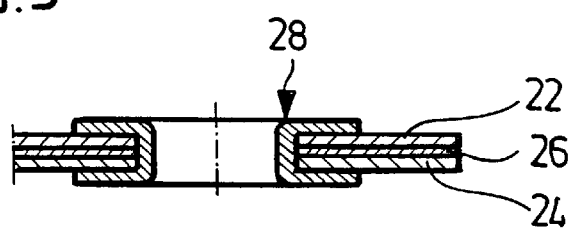
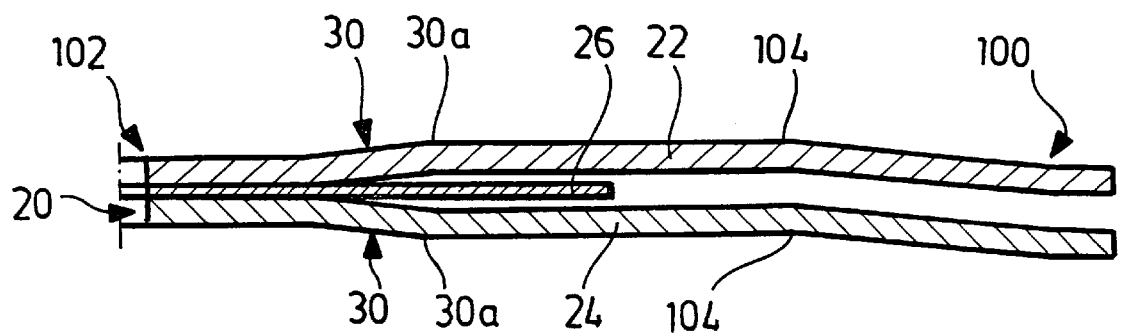

CYLINDER HEAD GASKET

The invention relates to a cylinder head gasket for a multicylinder engine comprising a chain case, with an engine block, a cylinder head and a chain case part which is mounted on the engine after the cylinder head gasket, which also serves to seal the chain case, is clamped between engine block and cylinder head, the cylinder head gasket having an elongate gasket plate defining a plane, and the engine having guide means for guiding the chain case part in the course of assembly thereof for displacement in the longitudinal direction of the gasket plate parallel to the plane of the gasket plate. The cylinder head gasket to which the invention relates comprises a group of combustion chamber openings, a chain case opening arranged between this group and a narrow side of the gasket plate, a gasket plate edge strip arranged between the chain case opening and this narrow side of the gasket plate, and screw openings for the passage of cylinder head screws therethrough, and, in particular, the gasket plate is essentially formed by one or several sheet metal layers.

With engines of the kind defined hereinabove, the chain case can be formed by a chain case top part arranged beside the cylinder head and a chain case bottom part arranged beside the engine block or crankcase. However, there are also constructions in which the top part of the chain case is formed by the cylinder head so that the latter engages over the engine block and a bottom part of the chain case, or in which the bottom part of the chain case is formed by the engine block above which the cylinder head and a top part of the chain case are arranged. In all these cases there results in at least one of the sealing surfaces between which the cylinder head gasket is clamped, and which are formed by the cylinder head and possibly a top part of the chain case and by the engine block and possibly a bottom part of the chain case, a joint between two engine components resting against each other, which in view of manufacturing tolerances can lead to sealing problems which will be explained with reference to an engine construction with a separate chain case top part and a separate chain case bottom part:

When assembling such an engine, the bottom part of the chain case is usually first screwed to the engine block, whereupon the cylinder head gasket which also serves to seal the chain case is placed on engine block and chain case bottom part and the cylinder head is then mounted and the cylinder head gasket clamped between the cylinder head and the engine block. The chain case top part is then inserted from the side onto positioning pins provided on the cylinder head and functioning as guide means and screwed through the cylinder head gasket to the chain case bottom part and tightened against the cylinder head gasket. Owing to manufacturing and assembly tolerances, there can result in the sealing surface resting against the one side of the cylinder head gasket in the area of the joint between engine block and chain case bottom part a step which results in the sealing surface area formed by the upper side of the chain case bottom part lying lower than the sealing surface area formed by the upper side of the engine block by, for example, 0.2±0.2 mm, i.e., up to 0.4 mm. As the chain case top part is assembled on positioning pins and hence very exactly, the risk of formation of an appreciable step in the other sealing surface due to manufacturing tolerances is very much smaller, albeit not excluded—but, in any case, the height of a step possibly present in the sealing surface formed by cylinder head and chain case top part is significantly smaller than the height of the step possibly present in the other sealing surface.

In order to reliably seal off the sealing gap between the two above-mentioned sealing surfaces, also when such steps are present, and, more particularly, also around the chain case whose cavity is not exclusively formed in the chain case top part and chain case bottom part, but is partially also delimited by side surfaces of the engine block and the cylinder head, so that the plane of division defined by the two above-described joints, which lie exactly above one another in the direction perpendicular to the plane of the sealing gap, traverses the cavity of the chain case, it is customary, with cylinder head gaskets whose gasket plate is formed by one or several sheet metal layers, to seal around the cavity of the chain case with at least one resiliently elastic bead which defines on both main surfaces of the cylinder head gasket around the chain case cavity at least one line closed within itself, along which an increased specific surface pressure results between the cylinder head gasket and the two sealing surfaces delimiting the sealing gap. With a cylinder head gasket whose gasket plate has only a single sheet metal layer consisting of resiliently elastic material, the bead can, for example, be a so-called full bead of approximately U-shaped cross section, whose bead crest forms on the one side of the cylinder head gasket a first such line and whose two so-called bead feet form on the other gasket side two such lines. However, a so-called half bead is also possible, whose cross section corresponds to an inclined step or a Z pulled flat, and which then forms such a line on both sides of the gasket. With cylinder head gaskets whose gasket plate comprises several sheet metal layers lying one on top of the other, the beads are formed in those sheet metal layers which form the two main surfaces of the gasket plate.

In addition to such beads, one has provided cylinder head gaskets for such engines in the area of the above-described steps or plane of division on both sides of the chain case cavity with elastomeric sealing elements in order to bridge the steps in the sealing surfaces and to seal off reliably the area of these steps (see, for example, DE-C-43 37 758 and EP-B-0 701 051).

With the engines in question, which comprise a chain case, the cylinder head gasket is traversed in the area of engine block and cylinder head in the vicinity of the chain case cavity by cylinder head screws serving to clamp the cylinder head gasket. The chain case cavity usually has in cross section in the plane of the sealing gap to be sealed off by the cylinder head gasket an approximately rectangular shape, with the longitudinal sides of this rectangle extending approximately transversely to the longitudinal direction of the elongate gasket plate of the cylinder head gasket, and the bead or beads surrounding the chain case cavity extending between the chain case opening of the cylinder head gasket and its screw openings for the cylinder head screws adjacent to the chain case cavity. If, following assembly of the chain case bottom part (but prior to assembly of the chain case top part) the cylinder head gasket is clamped between engine block and cylinder head by tightening the cylinder head screws, the gasket plate of the cylinder head gasket tends to have distortions as a result of the elastic deformation of the above-described bead or beads, with the result that a center portion of a gasket plate edge strip lying between the chain case opening and an outer narrow side edge of the gasket plate tends to arch in the direction towards the space to be accommodated by the chain case top part which has still to be mounted. When the chain case top part is then inserted from the side onto the positioning pins provided on the cylinder head, there is the danger that the arched area of the said gasket plate edge strip will be damaged and the sealing ability of the cylinder head gasket thereby impaired. The same applies accordingly to cylinder head gaskets for engines which do not have a separate chain case top part and a separate chain case bottom part, but only have a separate chain case part, which after the clamping of the cylinder head gasket is then inserted from the side onto guide means, such as positioning pins on the engine block or on the cylinder head.

SUMMARY OF THE INVENTION

The invention thus relates to a cylinder head gasket of the type referred to in the first paragraph of this specification, and the object of the invention is to eliminate or at least minimize in such cylinder head gaskets the danger of damage by a chain case part which is to be inserted from the side.

This object is accomplished, in accordance with the invention, in that the outer edge area of the center edge strip portion of the gasket plate described hereinabove is bent out of the plane of the gasket plate in a direction which points away from the separate chain case part which is to be mounted subsequently. The danger is thereby eliminated or at least minimized that when inserting the chain case part which has still to be mounted after the cylinder head gasket has been clamped between engine block and cylinder head, a collision will occur between the cylinder head gasket and this chain case part, thereby causing damage to the cylinder head gasket.

Advantageous further developments of the cylinder head gasket according to the invention are to be found in claims 2 to 4.

The invention will be explained in further detail hereinbelow with reference to a preferred embodiment of a cylinder head gasket according to the invention, which is shown in the appended drawings. In the drawings:

BRIEF DESCRIPTION OF THE DRAWINGS

FIGS. 2–4 are sections along lines 2—2, 3—3 and 4—4 in FIG. 1;

DETAILED DESCRIPTION OF THE INVENTION

Figure 1:
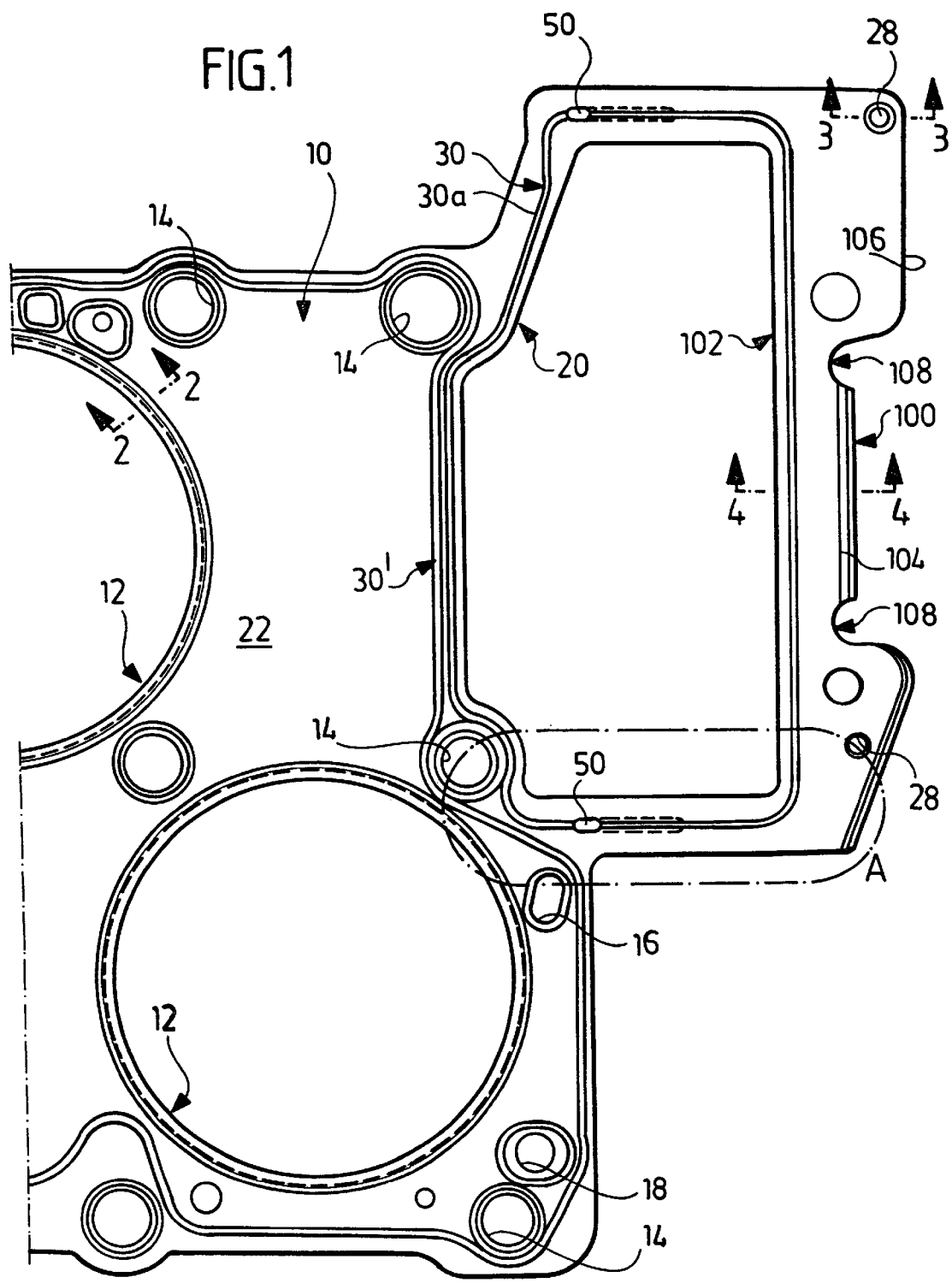
FIG. 1 is a plan view of part of the cylinder head gasket, which comprises two combustion chamber openings and a chain case opening of the gasket.

The cylinder head gasket shown partially in FIG. 1 has a gasket plate generally designated 10, in which a plurality of openings passing through the gasket plate are formed, for example, combustion chamber openings 12, screw holes 14 for passage of cylinder head screws, and water and oil holes 16 and 18, respectively. The cylinder head gasket also contains a chain case opening 20, around which sealing surfaces of a chain case top part and an adjacent cylinder head as well as a chain case bottom part and an adjacent engine block are to be sealed off from one another by the cylinder head gasket.

As will be apparent, for example, from FIG. 2, the gasket plate 10 is three-layered and comprises two outer or cover layers 22 and 24 consisting of steel sheets having elastic properties and being provided with beads, and a metallic center layer 26 folded back upon itself around the combustion chamber openings 12 and, therefore, usually referred to as flanged sheet layer. At several locations adjacent to the edge of the gasket plate 10, the three sheet metal layers 22, 24 and 26 are joined to one another by hollow rivets 28, as shown in greater detail in FIG. 3.

Around the chain case opening 20 there extends in the outer layer 22 and the outer layer 24, in each case, a half bead 30 (see also FIG. 4), which forms a bead line closed within itself and the crest of which is designated 30a.

Figure 5:
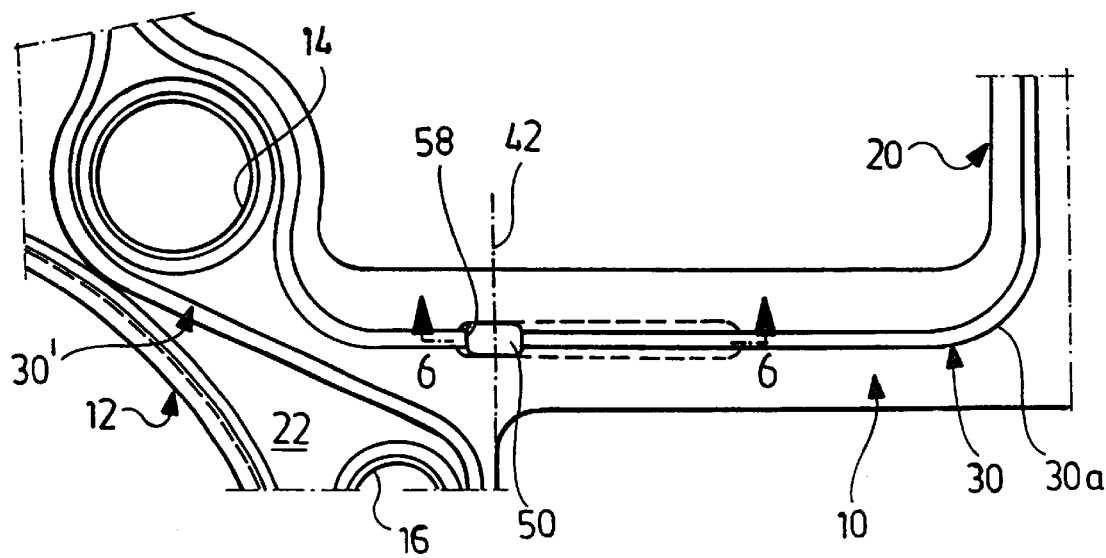
FIG. 5 is the area "A" indicated in FIG. 1 on a larger scale.
Figure 6:
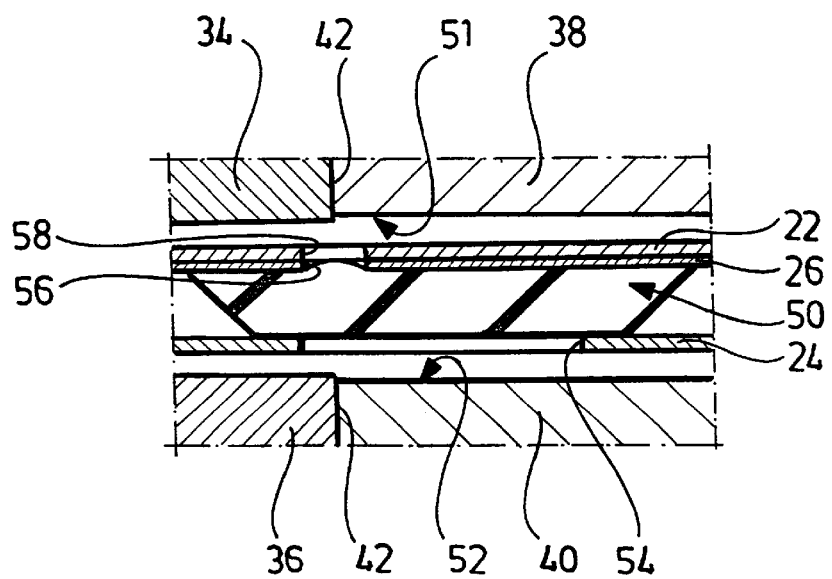
FIG. 6 is a section along line 6—6 in FIG. 5, with parts of an engine block, a cylinder head, a chain case top part and a chain case bottom part of an engine belonging to the gasket also indicated in FIG. 6.

The engine components relevant to the present invention are indicated, albeit only area-wise, in FIG. 6, namely a cylinder head 34, an engine block 36, a chain case top part 38 and a chain case bottom part 40. The joints at which the cylinder head and the chain case top part or the engine block and the chain case bottom part border on one another (butt joints) are designated 42, because in the illustrated embodiment the two joints or interfaces lie exactly above one another, and, for this reason, they are only indicated by a single dot-and-dash line in FIG. 5.

Whereas in the ideal case, which is difficult to bring about in practical terms, cylinder head and chain case top part or engine block and chain case bottom part form continuous, flat sealing surfaces, between which the cylinder head gasket is clamped, manufacturing and assembly tolerances often lead to the sealing surfaces designated 51 and 52 in FIG. 6 forming a small step at the joints 42. The step in the sealing surface 52 is, as a rule, significantly larger or higher than a step which may be present in the sealing surface 51, as assembly of the chain case top part 38 is often carried out on positioning pins and so very precisely. The sealing surface 52 in the area of the chain case bottom part 40 can lie lower than in the area of the engine block 36 by 0.2±0.2 mm, i.e., up to 0.4 mm, and, therefore, in accordance with the invention, the height of the "step" formed by the half bead 30 of the lower outer layer 24 is chosen significantly larger (e.g. 0.45 mm) than the height of the "step" (e.g. 0.25 mm) formed by the half bead 30 of the upper outer layer 22.

There are arranged on both sides of the chain case opening 20, more specifically, beside the narrow sides of the chain case opening, two essentially strand-shaped sealing elements 50 which—in a plan view of the gasket—lie below and between the half beads 30 or bead crests 30a. To produce the sealing elements 50, two strands consisting of an initially pasty sealing material and corresponding in their length to the length of the sealing elements 50 are applied to the surface of the center layer 26 on the engine block side. The sealing material can be made to solidify, in particular, by heating, so that initially it has not only elastic but also plastic properties and then only elastic properties. As will be apparent from FIG. 6 in conjunction with FIGS. 1 and 5, the lower outer layer 24 has under each sealing element 50 a window-like cutout 54 whose shape corresponds to that of an elongate hole or a long, narrow rectangle, which extends in the longitudinal direction of the adjacent sealing element 50. Furthermore, the center layer 26 and the upper outer layer 22 have over each sealing element 50 a further cutout 56 and 58, respectively, and these two similarly window-like cutouts preferably lie congruently above one another and have the shape of a significantly shorter elongate hole (in comparison with cutout 54). In a preferred embodiment, the cutouts 54, 56 and 58 have the following dimensions:

cutout 54: 3×23 mm.

cutouts 56, 58: 3×5 mm.

The height of the sealing elements 50 is several times greater (vertical dimension in accordance with FIG. 6) than the thickness of the outer layers 22 and 24—in a preferred embodiment the height of the sealing elements 50 is from 0.7 to 0.9 mm, while the thickness of the sheet metal of the outer layers 22 and 24 is from 0.20 to 0.25 mm.

When applying the sealing material later forming the sealing elements 50 to the center layer 26, the sealing material can enter the cutout 56 of the center layer, as indicated in FIG. 6. However, when the gasket is unpressed, the sealing elements 50 can not yet engage in the cutouts 54 and 58 since at least the layers 24 and 26 of the gasket plate 10 can be spaced from one another so long as the gasket is not clamped, i.e., not yet pressed. It is only when installing the gasket and clamping the gasket between the machine component sealing surfaces that the material of the sealing elements 50 enters the cutouts 54 and 58 and passes through these cutouts so that it projects over the two main surfaces of the gasket plate 10 and is pressed against the sealing surfaces 51 and 52, more specifically, precisely in the area of the joints 42. The sealing material forms on the outer side of the gasket plate over the cutout 54 an elongate, elastomeric rib, which is pressed against the sealing surface 52, whereas owing to the slight unevennesses of the sealing surface 51 on the upper side (in accordance with FIG. 6) of the gasket, a short elastomeric area of the sealing elements 50 exiting from the cutout 58 is sufficient for reliable sealing.

When manufacturing the flat gasket, it is readily possible, in order to produce the sealing elements 50, to apply strands of sealing material to the center layer 26 and, more particularly, in such a controlled way with respect to the length, width and volume of these strands as to exactly obtain the desired sealing elements 50. Of course, the strands of sealing material are applied to the sheet metal layer 26 before the layers 22, 24, 26 are put together to form the gasket plate 10.

As FIG. 1 shows, the beads 30 surrounding the chain case opening 20 extend in the direct vicinity of screw holes 14 adjacent to the chain case opening. The same applies to beads 30' which extend around the group of combustion chamber openings 12 and the group of water and oil holes 16 and 18, respectively. The beads 30 and/or the beads 30' result in distortions in the gasket plate 10 when the cylinder head gasket is clamped between the engine block 36 and the cylinder head 34 (by tightening cylinder head screws not shown) while the chain case top part 38 is still missing.

Owing to the still missing chain case top part 38, a center portion 100 of the gasket plate edge strip 102 shown in FIG. 1, which is not supported upwardly, tends to arch upwards, i.e., in the direction towards the space to be accommodated by the chain case top part 38 which has still to be mounted (see FIG. 6), which, when pushing on the chain case top part 38 from the right in accordance with FIGS. 1 and 6, could result in the right free edge of the edge strip portion 100 in accordance with FIG. 1 colliding with the chain case top part and the cylinder head gasket thereby being damaged.

To avoid this risk, as shown in FIGS. 1 and 4, the outer edge areas of the outer layers 22 and 24 are bent downwards along a bending line 104 in the area of the center edge strip portion 100—the center layer 26 ends before this bending line, as will be apparent from FIG. 4. To facilitate this downward bending, as shown in FIG. 1, the outer edge 106 of the gasket plate 10 forms at each of the two ends of the center edge strip portion 100 an indentation 108 which exposes the outer edge area of this edge strip portion and extends beyond the bending line 104 into the gasket plate. Furthermore, in the illustrated preferred embodiment the bending line 104 extends approximately transversely to the longitudinal direction of the gasket plate 10 (as is to be concluded from FIG. 1, the longitudinal direction of the gasket plate 10 extends horizontally in accordance with FIG. 1).

What is claimed is:

1. Cylinder head gasket for also sealing a chain case of a multicylinder engine comprising an engine block, a cylinder head and a chain case having a chain case part which is to be mounted after the cylinder head gasket has been clamped between the engine block and the cylinder head, the cylinder head gasket having an elongate gasket plate defining a plane, said chain case part in the course of assembly thereof being displaced in a longitudinal direction of the gasket plate parallel to said plane of the gasket plate, and the cylinder head gasket having a group of combustion chamber openings, a chain case opening arranged between said group and a narrow side of the gasket plate, a gasket plate edge strip defined by and arranged between the chain case opening and said narrow side of the gasket plate, said gasket plate edge strip having an outer edge area bordering on said narrow side of the gasket plate, a bead in said gasket plate edge strip, said bead being disposed between the chain case opening and said narrow side of the gasket plate, and screw openings for the passage of cylinder screws through the gasket plate, said screw openings being arranged such that when clamping the cylinder head gasket, a center portion of said gasket plate edge strip tends to arch in a direction towards a space which is to be accommodated by said chain case part still to be mounted, wherein said outer edge area of said center portion of said gasket plate edge strip includes a bend out of said plane of the gasket plate away from said space in a direction opposite to said direction, said bend being disposed between said bead and said narrow side of the gasket plate.

2. Cylinder head gasket as defined in claim 1, wherein at both ends of said center portion of said gasket plate edge strip, an outer edge of said edge strip is provided with an indentation exposing said outer edge area of said center portion.

3. Cylinder head gasket as defined in claim 1, wherein the outer edge area of the center edge strip portion is bent along a bending line extending approximately transversely to the longitudinal direction of the gasket plate.

4. Cylinder head gasket as defined in claim 1, wherein the gasket plate comprises several sheet metal layers, and the sheet metal layers present in the outer edge area of the center edge strip portion of the gasket plate are all bent.

* * * * *

UNITED STATES PATENT AND TRADEMARK OFFICE
CERTIFICATE OF CORRECTION

PATENT NO.    : 6,641,142 B2
DATED         : November 4, 2003
INVENTOR(S)   : Oliver Hegmann et al.

It is certified that error appears in the above-identified patent and that said Letters Patent is hereby corrected as shown below:

<u>Title page,</u>
Item [73], Assignee, replace with: -- ElringKlinger AG, Dettingen (DE) --.

Signed and Sealed this

Twenty-fifth Day of May, 2004

JON W. DUDAS
*Acting Director of the United States Patent and Trademark Office*